(12) United States Patent
Shimano et al.

(10) Patent No.: US 7,251,203 B2
(45) Date of Patent: Jul. 31, 2007

(54) OPTICAL DISC DRIVE APPARATUS, INFORMATION REPRODUCING OR RECORDING METHOD

(75) Inventors: Takeshi Shimano, Tokorozawa (JP); Tatsuro Ide, Fujisawa (JP)

(73) Assignee: Hitachi Media Electronics Co., Ltd., Mizusawa-Shi, Iwate (JP)

( * ) Notice: Subject to any disclaimer, the term of this patent is extended or adjusted under 35 U.S.C. 154(b) by 561 days.

(21) Appl. No.: 10/914,194

(22) Filed: Aug. 10, 2004

(65) Prior Publication Data

US 2005/0226111 A1    Oct. 13, 2005

(30) Foreign Application Priority Data

Apr. 1, 2004  (JP) .............................. 2004-108641

(51) Int. Cl.
*G11B 7/00* (2006.01)
(52) U.S. Cl. .............. 369/44.23; 369/112.02; 369/44.32
(58) Field of Classification Search ............. 369/44.23, 369/44.24, 112.01, 112.02, 44.32
See application file for complete search history.

(56) References Cited

U.S. PATENT DOCUMENTS 6,400,664 B1   6/2002  Shimano et al.
7,142,484 B2 * 11/2006 Ando et al. .............. 369/44.23
2003/0053393 A1  3/2003 Shimano et al.

FOREIGN PATENT DOCUMENTS

| JP | 2001-307349 | 11/2001 |
| JP | 2001-351255 | 12/2001 |
| JP | 2003-123282 | 4/2003 |

* cited by examiner

*Primary Examiner*—Nabil Hindi
(74) *Attorney, Agent, or Firm*—Antonelli, Terry, Stout & Kraus, LLP.

(57) ABSTRACT

Disclosed here is a method for solving a conventional problem that no spherical aberration signal can be detected from any push-pull signal that is easy to adjust an object photodetector when a differential push-pull signal is obtained. To achieve the above object, sub-beams used to detect a differential push-pull signal are defocused from the main beam and spherical aberration signals are detected and the compensation of the spherical aberration is started while tracking controlling is off and detection of spherical aberration signals is held while the tracking controlling is on. The present invention can thus obtain both of the spherical aberration signal and the differential push-pull signal at the same time with use of the conventional detection system.

8 Claims, 9 Drawing Sheets

Spherical aberration -1.5λ
Lens shift -0.3mm

Spherical aberration 0.0λ
Lens shift 0.0mm

OPTICAL DISC DRIVE APPARATUS, INFORMATION REPRODUCING OR RECORDING METHOD

CLAIM OF PRIORITY

The present application claims priority from Japanese application JP 2004-108641 filed on Apr. 1, 2004, the content of which is hereby incorporated by reference into this application.

CO-PENDING APPLICATION

U.S. patent application Ser. No. 10/220,188 is a co-pending application of the present application. The disclosure of the co-pending application is incorporated herein by cross-reference.

FIELD OF THE INVENTION

The present invention relates to an optical disk drive, more particularly to an optical disk drive provided with means for detecting spherical aberration and means for correcting the spherical aberration, as well as a method for reproducing or recording information, employed for the optical disk drive. Both of the means are required for recording/reproducing high density optical data.

BACKGROUND OF THE INVENTION

Consumer use optical disk drives are getting to be expanded in capacity by using 4.7 GB DVD media instead of the conventional 120 mm one-sided CD media having a capacity of 650 MB. And recently, the DVD media are getting to be replaced with 23 GB Blue-ray Disks (BD). The BD can record information for two hours in digital high vision quality while the DVD media can record information only for about two hours in NTSC image quality. This long-hour recording is realized by some technical improvements such as employment of shorter wavelength for semiconductor laser and high numerical aperture for objective lens. The laser wavelength is 780 nm for the CD and 650 nm for the DVD. And, for the BD, the laser wavelength reduction jumps to 405 nm (when a blue violet ray is used). Similarly, the NA is improved to as high as 0.45 for the CD and 0.6 for the DVD, and up to 0.85 for the BD in resolution. If the wavelength is assumed to be $\lambda$, the condensing spot size is proportional to $\lambda/NA$. And, when compared with the inverse number ratio of the spot area squared by the spot size, the capacity of the DVD will become 2.6 times that of the CD and the capacity of the BD will become 4.2 times that of the DVD. Actually, the capacity of the DVD is 7 times that of the CD and the capacity of the BD is 4.9 times that of the DVD. The signal processing technique such as error correction makes up for the shortage.

However, employment of such a high NA value for an objective lens to increase the capacity of the object media significantly comes to arise a side effect, that is, aberration occurrence. The aberration then causes degradation of the condensing spot due to a so-called spot fade and an increase of the spot size, which then causes the quality of recording/reproducing signals to be degraded. The objective lens is designed to condense lights optimally under fixed conditions. And, when any actual condensing state cannot satisfy the conditions, such aberration comes to occur. For example, disk inclination, improper thickness of both disk substrate and cover layer are such conditions. Of course, when the disk inclination is 0, the optimum condensation is assured. If the disk inclination is not 0, so-called coma occurs almost in proportion to the inclination angle and the substrate thickness. And, if the thickness of the disk substrate and the thickness of the cover layer are out of predetermined optimal values, aberration referred to as spherical aberration occurs in proportion to the deviation from the predetermined values. When such aberration occurs, the larger the NA value is, the more the sensitivity increases. The coma increases in proportion to the cube of the NA while the spherical aberration increases in proportion to the biquadrate of the NA. In other words, generally, the larger the NA is, the narrower the tolerance of disk inclination/thickness deviated from their predetermined values becomes.

In order to suppress the generation of such aberration partially, the disk substrate is made thin when high NA values are to be employed for the DVD and BD media. While the disk substrate is 1.2 mm for the CD media, the DVD disk substrate is reduced to 0.6 mm and the BD disk substrate is further reduced to 0.1 mm. (Actually, however, if the disk substrate is 0.1 mm, it does not function as a disk supporting member any longer. This is why, for DVD and CD media, the laser beam is not passed through the substrate to be condensed on the recording film from the back side of the substrate; the laser beam is condensed on the recording film through a 0.1 mm thick cover layer of the 1.1 mm thick substrate, which is coated at the recording film side of the substrate.) Consequently, the tolerance of BD/DVD inclination that causes coma as described above has been kept almost at the same level as that of the CD. And, because such spherical aberration often occurs in proportion to a substrate thickness deviation from its best thickness regardless of its initial substrate thickness, an increase of the NA value leads directly to the strangulation of the range of the tolerance of the substrate thickness deviation. This is why the tolerance range of the substrate thickness deviation of the BD is 3 µm, which is about 1/10 of that of the DVD, which has been 30 µm. If the BD has only one recording film layer, therefore, the BD is required to be manufactured so as to limit the cover layer thickness deviation within 3 µm. It is expected that the technical progress in recent years can satisfy the requirement, however. If a disk comes to have two recording layers formed with an interval of 20 µm and over therebetween to realize a large capacity, it is required to correct the spherical aberration to occur because of the thickness of the layer between those two recording layers (first and second) when the first layer is changed over to the second layer. In that connection, it is also required to correct the inter-layer deviation from its predetermined value, which is caused by uneven coating in a resin spinning coating process of the inter-layer film and an uneven thickness of the adhesive layer to occur in a film laminating process of the inter-layer.

A conventional technique for correcting detected spherical aberration is disclosed, for example, in WO2002/021520 (PCT application/No.JP01/007422, patent document 1). This patent document 1 discloses two methods for detecting spherical aberration. One of the methods detects a focal point at two places separately; a focal point of a beam detected around its beam axis and a focal point of a beam detected in the periphery of the beam axis. And, spherical aberration is detected from a deviation from each of the focal points. The essence of the spherical aberration is that the focal points of a beam close to the beam axis and a beam away from the beam axis are deviated from the beam axis in the front and rear direction. The conventional method detects such a deviation directly. This method can detect both of defocus error signals and spherical aberration signals in real time, so that the method can realize dynamic servo compensation of such spherical aberration.

The second method makes good use of a phenomenon that a focal point that gives the maximum amplitude to a tracking error signal (hereinafter, to be referred to as a push-pull signal) changes due to a value of such spherical aberration. A detecting method referred to as a push-pull method is used for detecting tracking error signals. The detecting method is also described in the above patent document 1. In the case of tracking error signal detection by the push-pull method, the following effect is used; the effect means that the reflection light from the disk is separated into a 0th order beam and a ±1st order diffracted beam due to a guiding groove formed cyclically on the disk and those separated beams interfere each other, thereby the interference intensity changes according to a tracking error. In other words, a two-divided photodetector is used to receive the intensity of the interference between the ±1st order beam and the 0th order beam and the intensity of the interference between the −1st order beam and the 0th order beam separately and a tracking error signal is obtained from a differential output of the photodetector. If the beam spot is positioned just on the track, those two beams are balanced, thereby the error signal takes a value of 0.

The JP-A No.351255/2001 discloses the third method. According to the method, in order to obtain push-pull signals of which focal points are defocused from the best focal point in the front and rear direction at the same time, three beams (one main beam and two sub-beams) are injected into the disk and a focus error is set in each of the two sub-beams beforehand so as to defocus it from the best focal point in the front and rear direction. And, when those sub-beams are deviated from the main beam just by ¼ of the guiding groove cycle on the disk or when a diffraction grating is used to dispose the main beam just on the track so as to obtain an effect equivalent to the above-described one practically, the push-pull signals from those two sub-beams come to have the maximum and minimum values. Consequently, when in tracking, the spherical aberration signal is obtained from a difference between the push-pull signals of the two sub-beams.

The differential push-pull method is described in, for example, in JP-A No.296875/11. Tracking error detection by the push-pull method is characterized in that consecutive tracking error signals can be detected easily from one beam spot. If the objective lens moves in the radial direction of the disk with respect to the injection beam when in tracking control, however, the beam spot formed in the photodetector also moves in combination with the objective lens sometimes to cause an offset error. In this conventional example, in order to avoid such a problem, three beam spots are condensed on the disk and two sub-spots adjacent to the main spot are deviated from the main spot just by ½ of the guiding groove cycle in the radial direction of the disk. As a result, tracking error signals of which polarities are inverted by 180° from that of the main spot are obtained from the sub-spots. And, because an offset error occurs in the main spot and the sub-spots at the same polarity respectively, a difference between the tracking error signal of the main spot and that of each of the sub-spots is calculated to enable detection of offset-cancelled tracking error signals.

[Patent document 1] W02002/021520
[Patent document 2] JP-A No.351255/2001
[Patent document 3] JP-A No.296875/1999

SUMMARY OF THE INVENTION

The push-pull method described in the patent document 1 might make the following problem arise. Because the push-pull method cannot detect signals in real time, the method is required to learn spherical aberration values and the learned values are fixed as control values of the spherical aberration at least around the regions of the learned values when in recording/reproducing information. The controlling accuracy might thus be degraded.

On the other hand, the method described in JP-A No.351255/2001 can obtain spherical aberration signals from push-pull signals in real time. However, the method cannot obtain spherical aberration unless otherwise tracking is turned on. In addition, because the push-pull signals of the sub-beams are deviated only by 90° in phase from that of the main beam, it is impossible to obtain a differential push-pull signal for canceling the offset of the push-pull signal to be caused by a movement of the objective lens together with those push-pull signals.

And, the differential push-pull method is an excellent tracking detection method, so that it is desired to detect both spherical aberration and tracking error signals with use of the differential push-pull method at the same time.

Under such circumstances, it is an object of the present invention to obtain differential push-pull signals that generate no offset error when the objective lens moves in tracking and detect spherical aberration signals from the push-pull signals that can adjust the subject photodetector in real time as often as possible.

At first, a description will be made for results of the examination performed by the inventor et al of the present invention before describing the configuration of this specification. In other words, the principles of the second method of the W00221520 A1 will be described first with respect to a reason why a focal point that gives the maximum amplitude to a push-pull signal is changed by spherical aberration. A function of the wavefront aberration that includes such spherical aberration is given as follows.

$$W(\rho) = W_{40}\rho^4 + W_{20}\rho^2 \qquad \text{[Expression 1]}$$

Here, W40 denotes a wavefront aberration coefficient of the spherical aberration and W20 denotes a wavefront aberration coefficient of a focus error when a paraxial focal point is defined as a reference point. The $\rho$ denotes the coordinates of a radius standardized as 1 at the stop of the objective lens. When such spherical aberration is detected, the best focal point (optimized focal point) becomes a position where the root mean square wavefront aberration (RMS wavefront aberration) is minimized. The mean square and the square of the mean value in this expression are calculated as follows.

$$\overline{W^2} = \frac{1}{\pi}\int_0^{2\pi}\int_0^1 (W_{40}\rho^4 + W_{20}\rho^2)^2 \rho\, d\rho\, d\theta \qquad \text{[Expression 2]}$$
$$= 2\int_0^1 (W_{40}^2\rho^9 + 2W_{40}W_{20}\rho^7 + W_{20}^2\rho^5)\, d\rho$$
$$= \frac{1}{5}W_{40}^2 + \frac{1}{2}W_{40}W_{20} + \frac{1}{3}W_{20}^2$$

$$(\overline{W})^2 = \left\{\frac{1}{\pi}\int_0^{2\pi}\int_0^1 (W_{40}\rho^4 + W_{20}\rho^2)\rho\, d\rho\, d\theta\right\}^2 \qquad \text{[Expression 3]}$$
$$= \left(\frac{1}{3}W_{40} + \frac{1}{2}W_{20}\right)^2$$
$$= \frac{1}{9}W_{40}^2 + \frac{1}{3}W_{40}W_{20} + \frac{1}{4}W_{20}^2$$

The RMS wavefront aberration is thus calculated as follows.

$$W_{rms}^2 = \overline{W^2} - (\overline{W})^2 \quad \text{[Expression 4]}$$
$$= \frac{4}{45}W_{40}^2 + \frac{1}{6}W_{40}W_{20} + \frac{1}{12}W_{20}^2$$

The condition for minimizing the aberration coefficient of this focus error is as shown below.

$$\frac{\partial W_{rms}^2}{\partial W_{20}} = \frac{1}{6}W_{40} + \frac{1}{6}W_{20} \equiv 0 \quad \text{[Expression 5]}$$

The wavefront aberration coefficient of the focus error is thus calculated as follows.

$$W_{20} = -W_{40} \quad \text{[Expression 6]}$$

As a result, the wavefront aberration coefficient of the spherical aberration and the absolute value become the same while they have signs opposite to each other. The actual focus error $\delta$ is calculated from this coefficient as follows.

$$\delta = \frac{2W_{20}}{(NA)^2} \quad \text{[Expression 7]}$$

The interference intensity that gives a push-pull signal here is obtained when a wavefront that includes such wavefront aberration is separated into a 0th order beam and a ±1st order beam by a beam diffraction effect obtained by the guiding groove and they come to be overlapped with each other. The phase distribution of the wavefronts that are overlapped with each other becomes uneven due to the aberration, thereby the amplitude of the push-pull signals is reduced. If this deviated amount is defined as ±Δx for each ±1st order diffracted beam, the phase difference between two wavefronts can be approximated as follows.

$$\Delta W = W(x \pm \Delta x, y) - W(x, y) \quad \text{[Expression 8]}$$
$$\cong W(x, y) \pm \frac{\partial W}{\partial x}\Delta x - W(x, y)$$
$$= \pm \frac{\partial W}{\partial x}\Delta x$$

If wavefront aberration that includes spherical aberration is substituted for here, the $\rho$ that denotes polar coordinates is replaced with xy coordinates as follows.

$$\Delta W = \pm \Delta x \frac{\partial}{\partial x}\{W_{40}(x^2 + y^2)^2 + W_{20}(x^2 + y^2)\} \quad \text{[Expression 9]}$$
$$= \pm \Delta x\{4W_{40}x(x^2 + y^2) + 2W_{20}x\}$$
$$= \pm \Delta x\{4W_{40}\rho^3 \cos\theta + 2W_{20}\rho \cos\theta\}$$

A focal point that gives the maximum amplitude to a push-pull signal can be approximated with a position where the RMS value of this phase difference is reduced to a very small one due to a focus error. Thus, the square mean and the square of a mean value can be obtained as follows just like in the above case.

$$\overline{(\Delta W)^2} = \frac{1}{\pi}\int_0^{2\pi}\int_0^1 (\Delta x)^2\{4W_{40}\rho^3 + \cos\theta + 2W_{20}\rho\cos\theta\}^2 \rho d\rho d\theta \quad \text{[Expression 10]}$$
$$= \frac{4}{\pi}(\Delta x)^2 \int_0^{2\pi}\int_0^1 \{4W_{40}^2\rho^7 + 4W_{40}W_{20}\rho^5 + W_{20}^2\rho^3\}\cos^2\theta d\theta d\rho d\theta$$
$$= 4(\Delta x)^2\left\{\frac{1}{2}W_{40}^2 + \frac{2}{3}W_{40}W_{20} + \frac{1}{4}W_{20}^2\right\}$$

$$(\overline{\Delta W})^2 = \left\{\frac{1}{\pi}\int_0^{2\pi}\int_0^1 (\Delta x)\{4W_{40}\rho^3\cos\theta + 2W_{20}\rho\cos\theta\}\rho d\rho d\theta\right\}^2 \quad \text{[Expression 11]}$$
$$= \left\{\frac{2\Delta x}{\pi}\int_0^{2\pi}\int_0^1 \{2W_{40}\rho^4 + W_{20}\rho^2\}\cos\theta d\rho d\theta\right\}^2$$
$$= 0$$

The RMS value is thus calculated as follows.

$$\Delta W_{rms}^2 = \overline{\Delta W^2} - (\overline{\Delta W})^2 \quad \text{[Expression 12]}$$
$$= 4(\Delta x)^2\left\{\frac{1}{2}W_{40}^2 + \frac{2}{3}W_{40}W_{20} + \frac{1}{4}W_{20}^2\right\}$$

And, the wavefront aberration of a focus error that minimizes the RMS value satisfies the condition of the following expression.

$$\frac{\partial \Delta W_{rms}^2}{\partial W_{20}} = 4(\Delta x)^2\left\{\frac{2}{3}W_{40} + \frac{1}{2}W_{20}\right\} \equiv 0 \quad \text{[Expression 13]}$$

The focus error wavefront aberration value is thus calculated as follows.

$$W_{20} = -\frac{4}{3}W_{40} \quad \text{[Expression 14]}$$

Consequently, a difference between the wavefront aberration value of a focus error at the best focal point of a wavefront that includes spherical aberration and the wavefront aberration value of a focus error that gives the maximum amplitude push-pull signal is calculated as follows.

$$\Delta W_{20} = \left(-\frac{4}{3}W_{40}\right) - (-W_{40}) = -\frac{1}{3}W_{40} \equiv \frac{\delta}{2}(NA)^2 \quad \text{[Expression 15]}$$

The focus error value corresponding to this wavefront aberration is calculated as follows.

$$\delta = -\frac{2}{3(NA)^2}W_{40} \quad \text{[Expression 16]}$$

In other words, if spherical aberration is detected, the focal point that gives the maximum amplitude push-pull signal comes to be shifted in proportion to the wavefront aberration coefficient of the spherical aberration. This phenomenon is used in the above conventional example to detect the push-pull signals when the focal points of the sub-beams are deviated from the best focal point in the front and rear direction to obtain a differential signal between those signals, thereby signals that are almost proportional to the spherical aberration are obtained. And, this method is characterized in that such spherical aberration can be detected only by employing an adjusting flow that deviates the focal points of the sub-beams from that of the main beam as described above while the conventional configurations of both the photodetector and the optical system are kept as are. However, this method cannot detect signals in real time as described above.

In order to solve the above conventional problems, according to one aspect of the present invention, the optical disk drive is configured by a beam source, an optical system for condensing a first beam and a second beam defocused from the first beam to be irradiated onto a medium, a photodetector for detecting a reflected beam from the medium, means for detecting a first push-pull signal amplitude from the first beam and a second push-pull signal amplitude from the second beam to generate a spherical aberration signal from the first and second push-pull signal amplitudes, compensating means for compensating the spherical aberration according to the spherical aberration signal, and controlling means for controlling so that detection of the spherical aberration signal is held while the tracking control is on. As a result, spherical aberration signals can be detected while the tracking control is on. Consequently, a differential push-pull signal can also be obtained at the same time. Because of such a configuration of the optical disk drive, the conventional detection system can be used as is; there is no need to modify the detection system.

At that time, the defocus value of each beam is considered to be enough to read push-pull signals. Concretely, the defocus value is about $0.36\lambda$ at NA=0.85 within about $\pm 0.4$ µm, at $\lambda=0.405$ µm, and at defocus wavefront aberration coefficient=W20. At that time, the first and second beams are defocused from the best focal point in the front and rear direction; for example, the first beam is defocused by +0.4 µm and the second beam is defocused by −0.4 µm from the best focal point respectively.

FIG. 1 shows a calculation result of the defocusing characteristic of the push-pull signal at an NA of 0.85, at a wavelength of 0.405 µm, and at a track pitch of 0.32 µm. As described above, it is found here that if a spherical aberration value changes due to a cover layer thickness deviation, the peak position is also shifted. The defocus value within which push-pull signals can be read is about within $\pm 1$ µm of the maximum defocus value at which a push-pull signal has the maximum value regardless of the cover layer thickness.

FIG. 2 shows a relationship between a spherical aberration detection signal found from FIG. 1 and a cover layer thickness deviation. Here, the defocus values of two beams are changed in 6 ways in steps of 0.1 µm within $\pm 0.1$ µm and $\pm 0.6$ µm. It is found that detection signals are obtained in proportion to the cover layer thickness deviation within a range of $\pm 10$ µm. The detection sensitivity is approximately saturated at a defocus value of $\pm 0.4$ µm and the cover layer thickness deviation detection range is narrowed to $\pm 10$ µm at $\pm 0.5$ µm and over. This is because the push-pull signal amplitude becomes almost 0 at a defocus value of −0.5 µm if the cover layer thickness deviation is 10 µm in FIG. 1. The defocus value is thus optimized at about $\pm 0.4$ µm when the NA is 0.85 and the wavelength is 0.405 µm.

Because the cover layer thickness deviation detection range is $\pm 10$ µm, it is a little narrower than the interval between layers of the two-layer disk. In the case of a multi-layer media having two or more layers, therefore, it is just required that the compensation value of spherical aberration of the inter-layer interval is roughly changed to another so that the compensation error becomes $\pm 10$ µm and under at the time of inter-layer jump, thereby the compensation residual difference is detected and compensated.

When the compensator is driven by a spherical aberration signal detected as described above, the spherical aberration at the condensing spot comes to be compensated satisfactorily.

According to the second aspect of the present invention, the optical disk drive is characterized as follows; the first and second beams used in the first aspect become first and second sub-beams defocused from the main beam condensed in a predetermined layer in the front and rear direction. Because the main beam is condensed in the predetermined layer and the two sub-beams defocused as described above are deviated by about ½ of the guiding groove of the disk from the main beam, the push-pull signal of the main beam, as well as the push-pull signals of the two sub-beams can be inverted in polarity. And, the differential push-pull method can be used to obtain a differential signal from those push-pull signals to suppress generation of offsets in the tracking error signals even when the objective lens moves due to the disk decentering while the tracking servo is on. At that time, the sub-beams that are defocused as described above are lower in amplitude than the main beam, so that the sub-beams are required to be amplified with a proper amplification gain respectively, for example, to compensate the amplitude equally to that of the main beam.

According to the third aspect of the present invention, defocused sub-beams in the first aspect are formed with use of a curvilinear diffraction grating. The curvilinear diffraction grating is disposed in an concentric circle pattern and the pitch is tapered step by step toward its periphery. The curvilinear diffraction grating is a so-called Fresnel zone plate that is cut at a decentered point. The Fresnel zone plate is effective to let a diffracted beam to work as a lens. The effect of this lens that functions as Fresnel zone plate is to enable a diffraction lens to function as a lens. The orientation of this lens is inverted between the −1st order diffracted beam and the +1st diffracted beam. If the lens functions as a convex lens for the +1st diffracted beam, the lens functions as a concave lens for the −1st diffracted beam. On the contrary, if the lens functions as a concave lens for the +1st diffracted beam, the lens functions as a convex lens for the −1st diffracted beam. Those diffracted beams can be controlled easily to form sub-beams to be defocused from the main beam formed by a 0th non-diffracted beam oppositely to each other in the front and rear directions.

According to the fourth aspect of the present invention, the method for recording/reproducing information, employed for the optical disk drive described in the first aspect of the present invention, comprises the steps of irradiating a main beam focused on a predetermined layer of the object medium, as well as first and second sub-beams defocused from the main beam in the front and rear direction on the medium, all those means being supplied from a beam source; detecting a first signal amplitude from the first or second sub-beam and a second signal amplitude from the main beam, both first and second signal amplitudes being included in the beam reflected from the medium; starts detection of a spherical aberration signal according to the first and second signal amplitudes; and compensating the spherical aberration when the tracking control is on according to a spherical aberration signal detected when the tracking control is off.

The present invention, therefore, makes it possible to detect a spherical aberration signal together with a differential push-pull signal. The differential push-pull signal generates no offset to be caused by a lens movement when in tracking. If sub-beams are defocused from the best focal point respectively beforehand to achieve the above object, the sub-beams can be defocused more stably, thereby the signal detection can be controlled more accurately.

DETAILED DESCRIPTION OF THE PREFERRED EMBODIMENTS

First Embodiment

Figure 1:
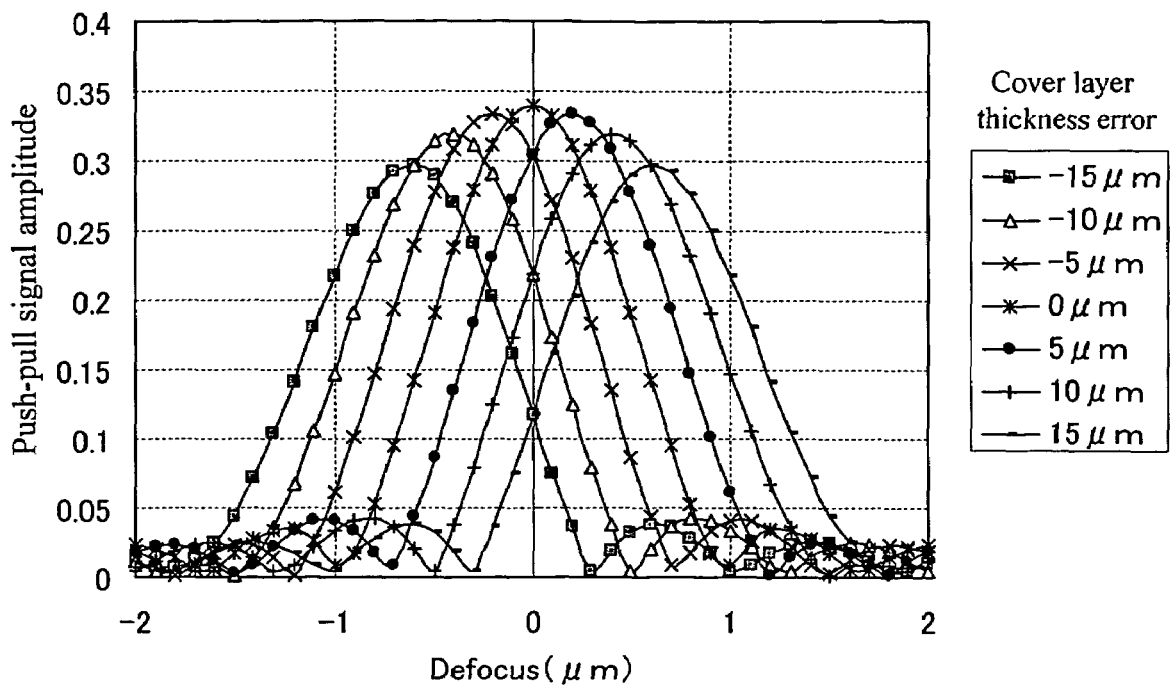
FIG. 1 is calculation results of the defocusing characteristic of push-pull signals.
Figure 2:
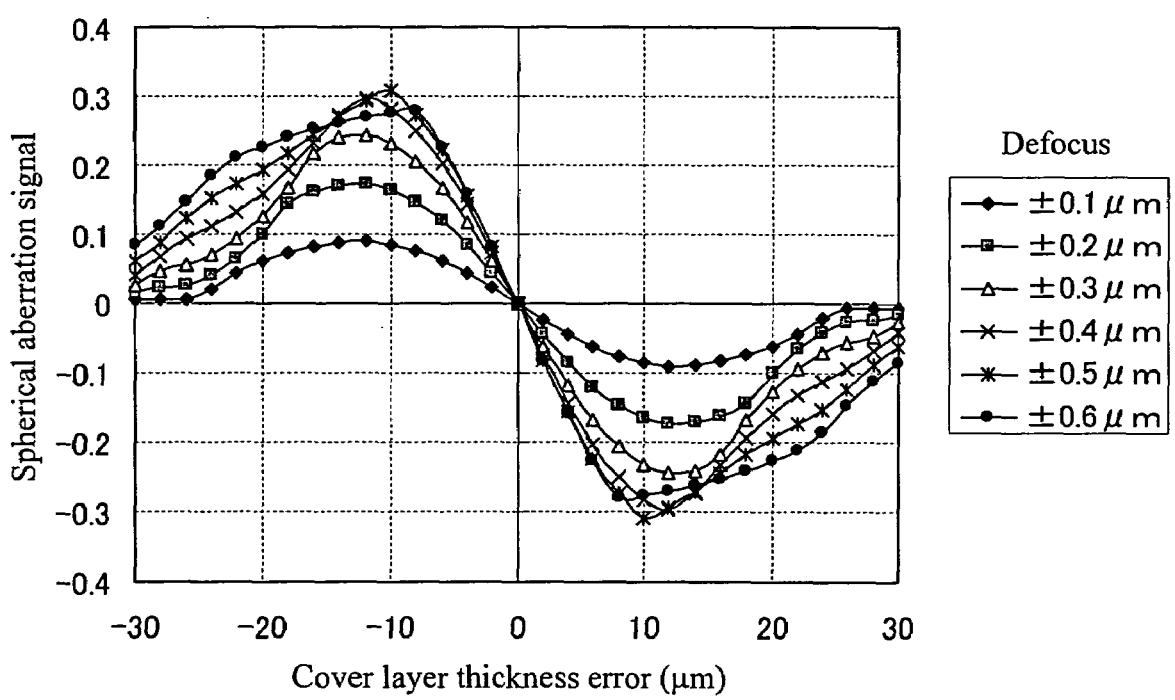
FIG. 2 is spherical aberration detection signals obtained in FIG. 1.

Hereunder, the first embodiment of the present invention will be described with reference to FIG. 3. A beam emitted from a semiconductor laser 301 is transformed into parallel beams by a collimator lens 302, then separated by a curvilinear diffracted grating 303 into a 0th order beam that goes linearly, a +1st order diffracted beam converged slightly by the action of the curvilinear grating lens with respect to the 0th order beam, and a −1st order diffracted beam that diverges slightly with respect to the 0th order beam. In order to simplify the description here, however, those diffracted beams just output from the curvilinear diffracted grating 303 are not illustrated. After that, those beams are passed through a beam splitter 304 and a spherical aberration compensator 305, then reflected by a rising mirror 306, and finally condensed on an optical disk 309 through an objective lens 308 provided in a tracking actuator 307 as a main beam 310 and sub-beams 311 and 312. The two sub-beams form diffracted beam spots condensed by the curvilinear diffracted grating 303. The focal points of those sub-beams are deviated from the main beam in the front and rear direction along the beam axis. The optical disk 309 is rotated by a spindle motor 313.

The reflected beam is reflected again by the beam splitter 304, then condensed on a photodetector 316 through a condensing lens 314 and a cylindrical lens 315. The spots corresponding to the three spots formed on the disk surface are detected here separately. Because the astigmatic detection method is used to detect focus error signals in this embodiment, the cylindrical lens 315 generates astigmatism. Signals from the photodetector 316 are inputted to a tracking error signal detection circuit 317 to generate push-pull signals corresponding to the main beam and the two sub-beams respectively. The push-pull signals of the two sub-beams are added up in an adder 318, then amplified by an amplification circuit 319. After that, a differential amplifier 320 obtains a difference from the main beam push-pull signal to obtain a differential push-pull signal. This differential push-pull signal is fed back to an actuator 307 through a switching circuit 322 according to a tracking control signal from a CPU 321. The push-pull signals of the two sub-beams are transformed into voltage signals in the amplitude detection circuit 323 according to the amplitude, then the differential amplification circuit 324 obtains a difference between those voltage signals to output a spherical aberration signal.

The spherical aberration signal is turned on/off by the switching circuit 325 according to the SA control signal from the CPU 321. Similarly, according to the tracking control signal from the CPU 321, the spherical aberration signal is inputted to a sample-hold circuit 326 that switches between sampling and holding states. The spherical aberration signal passing through the sample-hold circuit 326 is fed back to the spherical aberration compensator. Consequently, the spherical aberration is compensated. However, the spherical aberration is detected only while the push-pull signal is obtained. When in tracking control, spherical aberration detection is impossible. This is why the spherical aberration signal obtained in the previous period in which tracking control is off is given to the spherical aberration compensator 305 as a fixed value, thereby the spherical aberration signal is kept given to the compensator 305 even when tracking control is on. Consequently, compensation comes to be made easily for the cover layer thickness difference between inner and outer peripheries of the disk and a layer interval error when control jumps from a layer to another of a two-layer disk, although spherical aberration is not controlled in real time strictly. In FIG. 3, the focus error detection circuit, and suchlike are not shown in order to simplify the description. However, focus error signals are detected with use of the astigmatic detection method from the output signals of the detector 316 and amplified at a proper gain respectively, then fed back to the actuator 307 under the control of the CPU 321.

Figure 4:
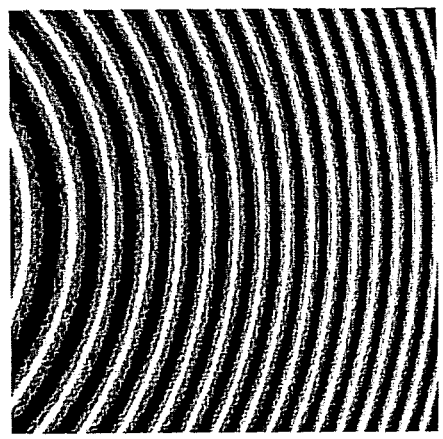
FIG. 4 is a design of a curvilinear diffraction grating used in the present invention.
Figure 5:
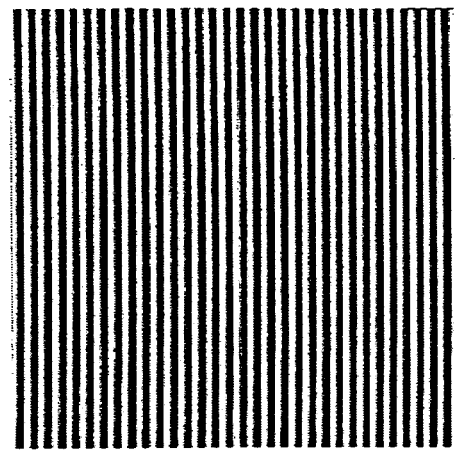
FIG. 5 is another design of the curvilinear diffraction grating used in the present invention.

FIG. 4 illustrates an example of a curvilinear diffracted grating. In order to simplify the description here, the pitch is set wider and the curvilinear curvature is set larger than actual ones. In FIG. 4, a circle inscribed in a frame square has an effective beam diameter equal to a defocus value of about 8 μm of a sub-spot with respect to the main spot on the disk and an interval between the main spot and each sub-spot is about 7 μm when the objective NA is 0.85. Actually, if the interval between the main spot and each sub-spot is 15 μm and the defocus value is 0.5 μm, the average grid interval becomes $7/15 \approx 1/2$ and the curvilinear curvature becomes $(7/8)/(15/0.5) \approx 1/34$. The curvilinear grating thus comes apparently to look like almost a linear grating. FIG. 5 illustrates the curvilinear diffracted grating described above.

Figure 6:
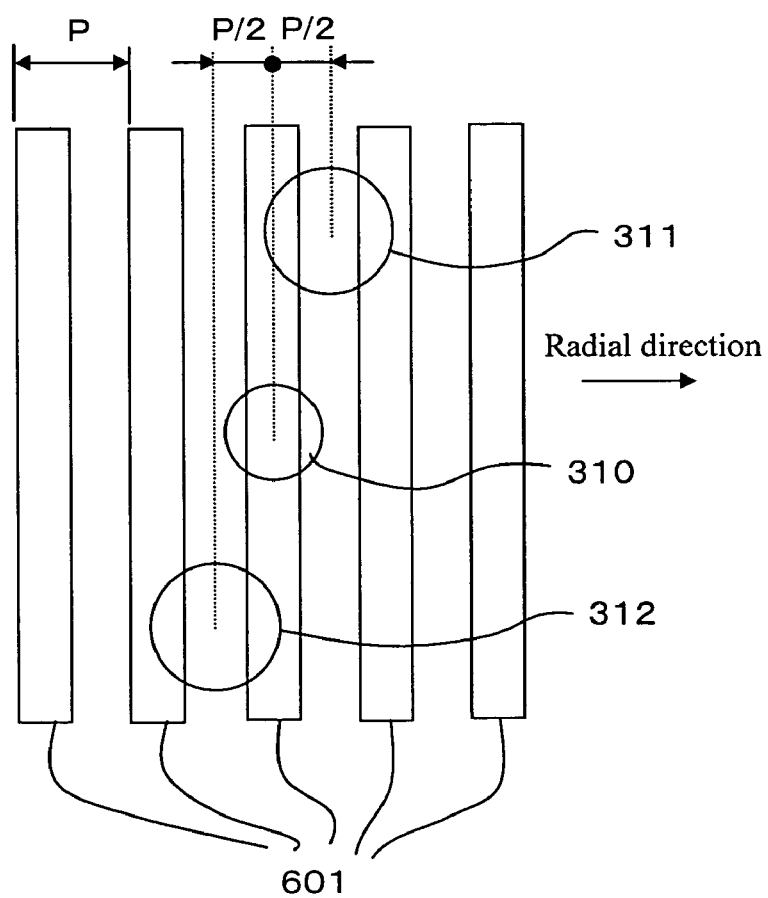
FIG. 6 illustrates how beam spots are disposed on a disk.

FIG. 6 illustrates how beam spots are disposed on a disk. Sub-spots 311 and 312, when they are formed on the disk, are deviated from a main spot 310 in the radial direction of the disk by ½ of the cycle P of the guiding groove formed in the disk. In other words, the sub-spots are defocused slightly from the main spot in the front and rear direction along the beam axis, so that the sub-spots become larger slightly than the main spot.

Figure 3:
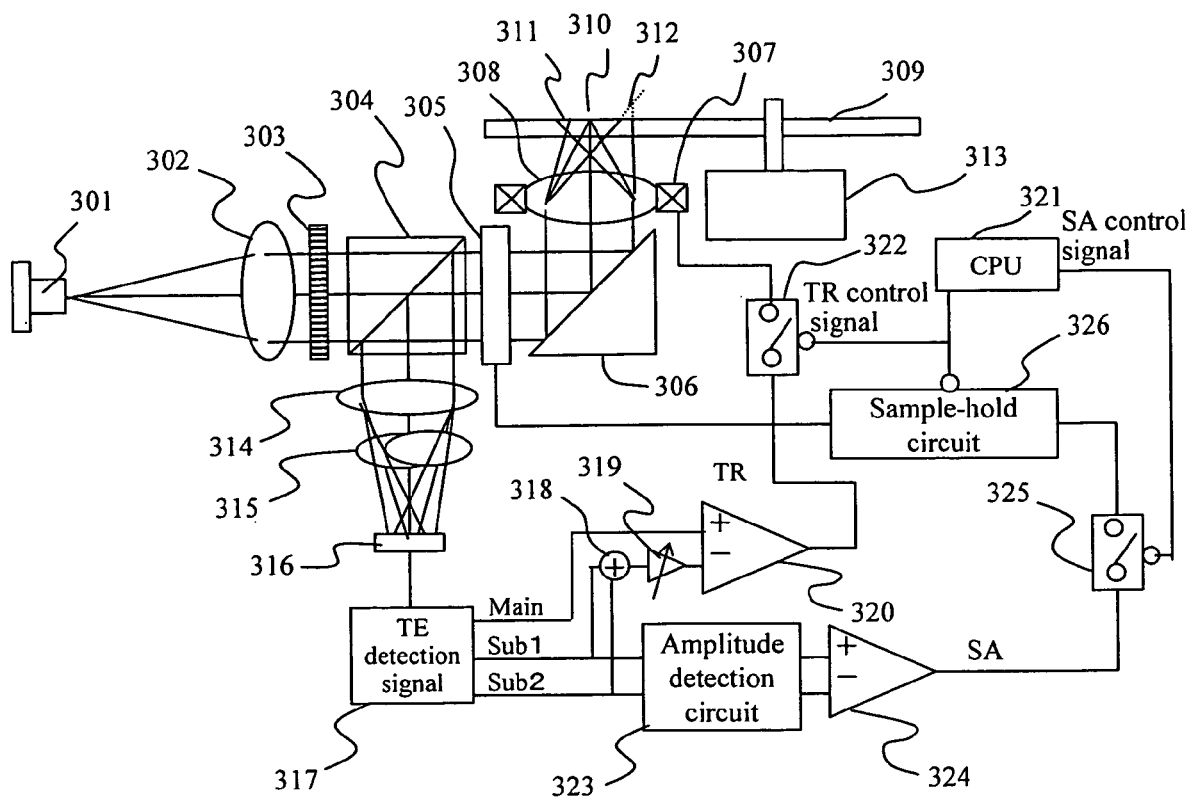
FIG. 3 is a block diagram of an optical system in an embodiment of the present invention.
Figure 7:
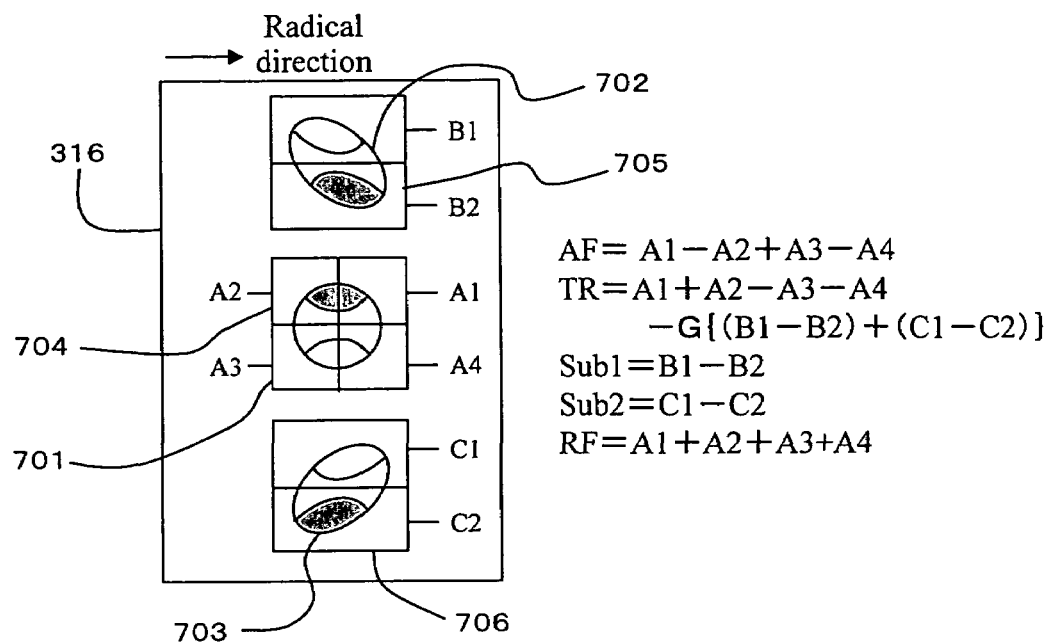
FIG. 7 illustrates received beam patterns detected by a photodetector.

FIG. 7 shows beam spot patterns detected by the photodetector 316 shown in FIG. 3. The main spot 701 and the sub-spots 702 and 703 on the photodetector 316 are injected into a four-divided photodetection region 704 and a two-divided photodetection regions 705 and 706 respectively. The main spot 702 and the sub-spots 702 and 703 interfere each another, since their diffracted beams are laid one upon another due to the guiding groove formed in the disk. In this embodiment, because the astigmatic detection method is used to detect focal points, the optical system is adjusted so that the least confusion circle of an astigmatism-occurred beam spot is irradiated on the disk when the main spot is just focused on the disk. Unbalanced intensity distribution caused by mutual interference of diffracted beams appears inversely between the main beam 704 and the sub-beams 702/703. In other words, as shown in FIG. 7, the main spot 704 has a dark upper region while each of the two sub-spots 702 and 703 has a dark lower region. This is because condensed beam spots come to differ between the main spot and each sub-spot; concretely, the two sub-beam spots are deviated from the main beam spot by a half of the guiding groove cycle of the disk in the radial direction of the disk.

A focus error signal (AF) and a reproduction signal (RF) are detected from the four signals A1 to A4 output from the four-divided photodetection region 704 as calculated by the expression shown in FIG. 7. The signals AF and RF are combined with the output signals B1, B2, C1, and C2 of the two-divided photodetection region to detect a tracking error signal (TR) with use of the differential push-pull method. At that time, the operation gain G for a difference between the main beam and the sub-beams may take a value obtained by dividing the sum of the output signals of the main beam by the sum of the output signals of the sub-beams so as to cancel the offset caused by a lens movement. Then, U.S. Pat. No. 6,400,664 is incorporated here. The beam spot patterns detected by the photodetector shown in FIG. 7 are general ones used widely for CD-R, etc.

Figure 8:
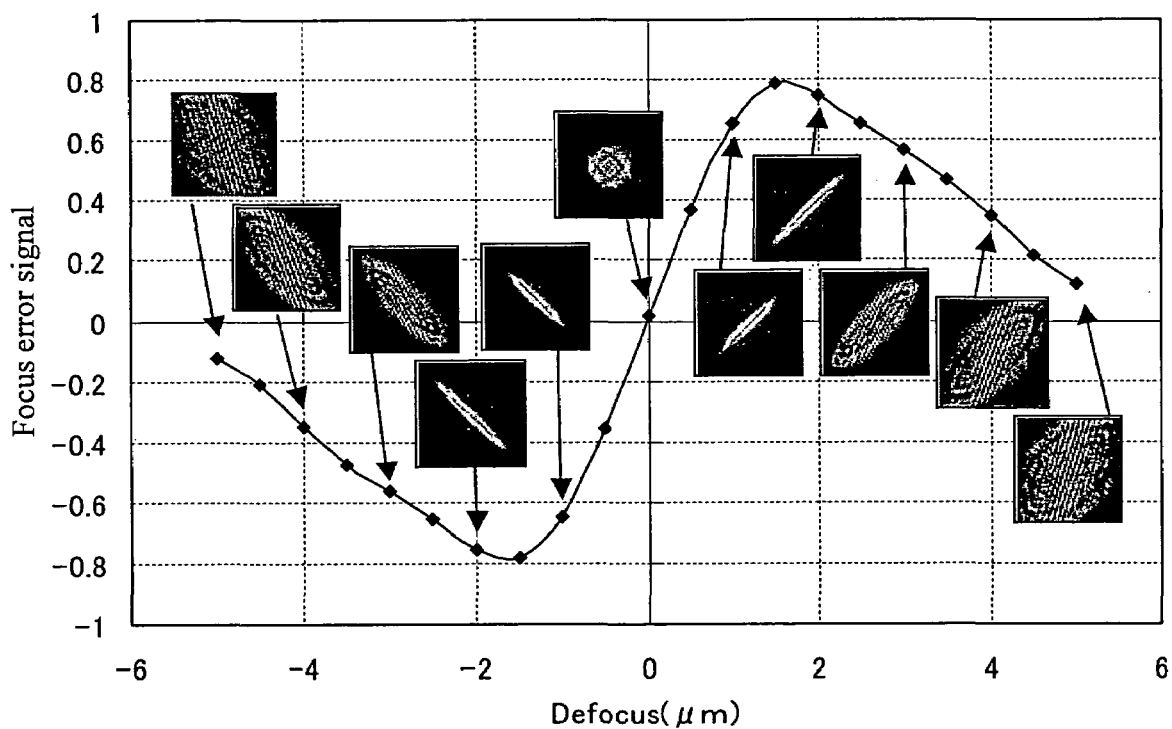
FIG. 8 illustrates detection results of focus error signals.

FIG. 8 illustrates detection results of focus error signals. The wavelength of the semiconductor laser is 405 nm, the emission angle is 8.5° in the radial direction of the disk, and the 22° half value full width direction is matched with the tangential line direction. The focal distance of the collimator lens is 15 nm, the objective lens NA is 0.85, and the effective beam diameter is 3 mm. The focal distance of the detection lens is also 15 nm and an astigmatism event comes to occur due to the cylindrical lens at an astigmatism difference of 0.44 mm in the detection system. Each side of the four-divided photodetector used for the 0th order beam is 100 μm in size. The divided dark line width is about 10 μm. The vertical axis is standardized with a signal that denotes the sum of output signals of the four beam receiving parts before it is displayed. In FIG. 7, actual detected beam distribution is shown in each focus error. In the photo range, each side is 100 μm and it is matched with the size of the beam receiving part.

Figure 9:
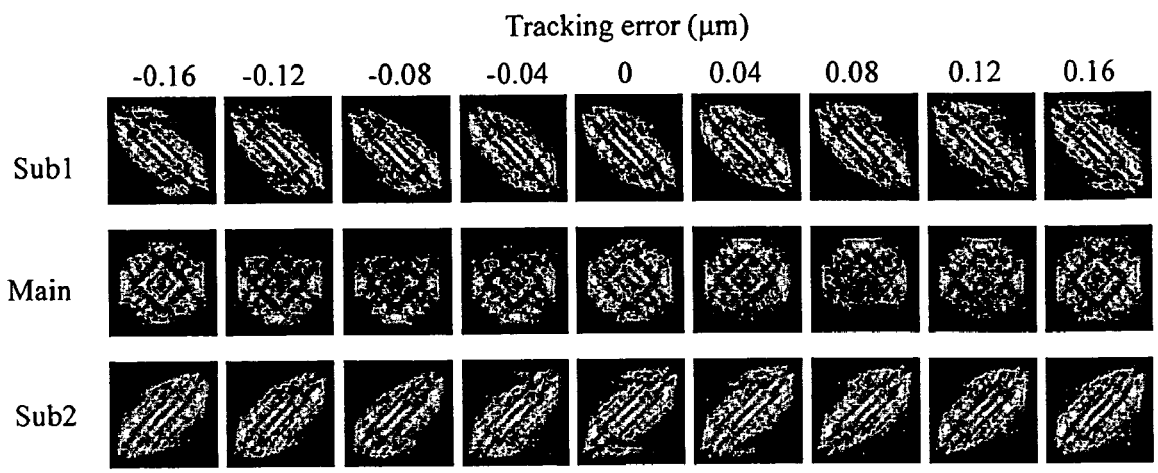
FIG. 9 illustrates distribution of detected beams with respect to tracking errors of a main beam and sub-beams.

FIG. 9 illustrates detected beam distribution with respect to tracking errors of the main beam and the sub-beams. The main beam is focused on the main spot on the disk while the two sub-beams are deviated from the focal point of the main spot by 0.1 μm in the front and rear directions. In FIG. 9, astigmatism is detected in the detector, since the astigmatic detection method is used to detect focal points. And, two beam spots are slightly expanded to the left and right sides at 45° respectively. FIG. 9 also shows that the intensity distribution of those beam spots has changed due to a detected tracking error. The track pitch of the disk is 0.32 μm. And, in FIG. 9, the intensity changes at both upper and lower edges of each spot due to the detected tracking error.

Figure 10:
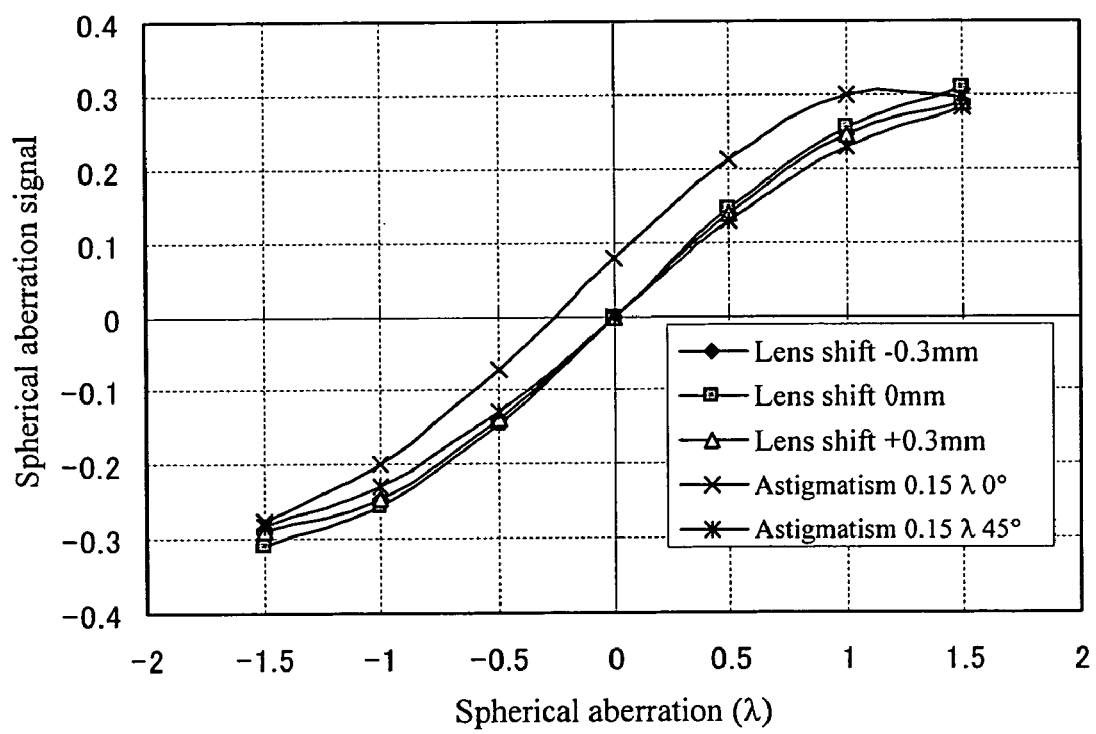
FIG. 10 illustrates detection results of spherical aberration.

FIG. 10 shows detection results of spherical aberration. The horizontal axis denotes an aberration coefficient of Seidel aberrations. At 1.5λ, the cover layer thickness error of the disk becomes about 11 μm, which denotes that a favorable spherical aberration signal is detected within a cover layer thickness error range. If astigmatism occurs in the subject optical system and it works in the radial direction of the disk (0°), an offset occurs in the detected spherical aberration signal. However, the astigmatism is generated fixedly in the detection system. Generally, because the spherical aberration signal is not changed so much, the disk cover layer thickness error can be detected accurately if a reference disk is used to correct the 0 point beforehand when the disk drive is manufactured.

Figure 11:
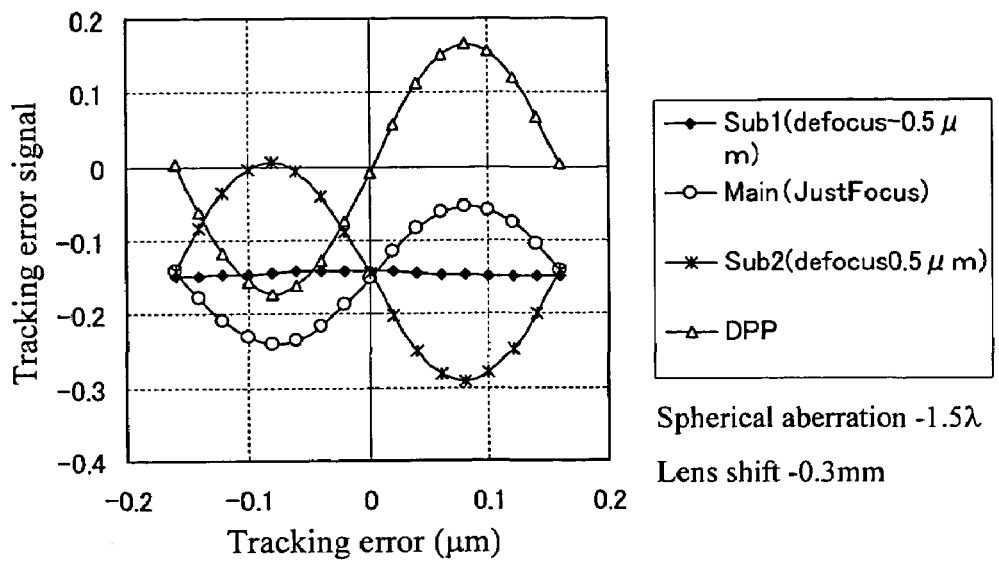
FIG. 11 illustrates tracking error signals detected at spherical aberration of −1.5λ and a lens shift of −0.3 mm.
Figure 12:
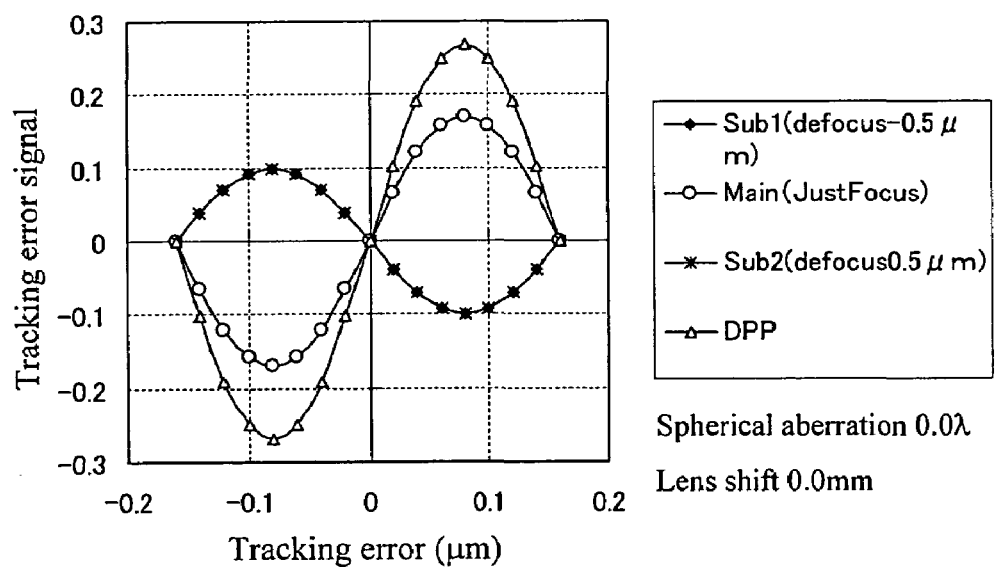
FIG. 12 illustrates tracking error signals detected when none of spherical aberration and lens shift is recognized.
Figure 13:
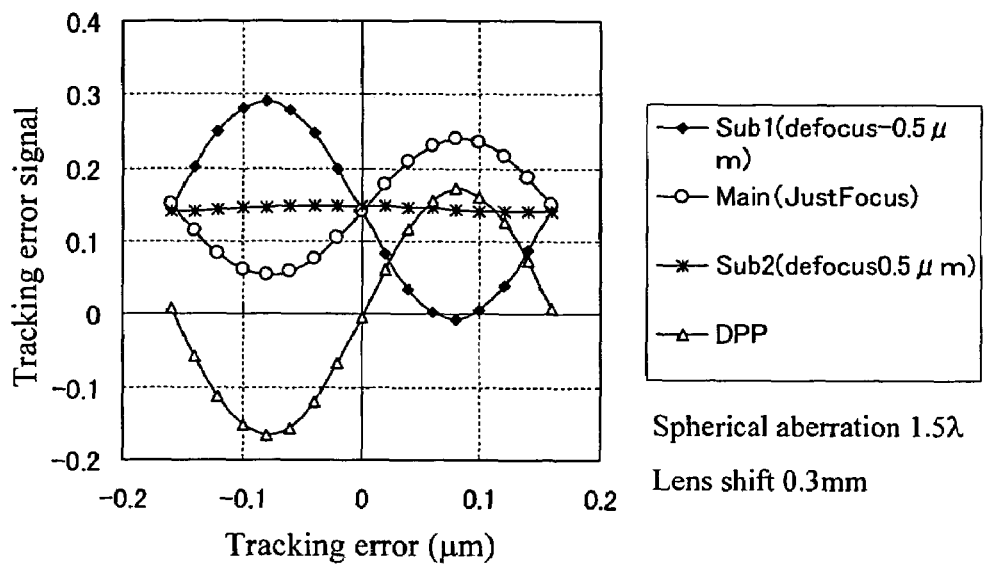
FIG. 13 illustrates tracking error signals detected at spherical aberration of 1.5λ and a lens shift of 0.3 mm.

FIG. 11 illustrates a relationship among tracking error signals of the main beam, the two sub-beams when the spherical aberration is −1.5λ and the lens shift is −0.3 mm, and a differential push-pull signal (denoted as DPP in the figure) calculated from those tracking error signals. Similarly, FIG. 12 illustrates the same relationship when both of the spherical aberration and the lens shift are 0 and FIG. 13 illustrates the same relationship when the spherical aberration is +1.5λ and the lens shift is 0.3 mm. As described above, an offset occurs at a polarity corresponding to the code in each of the tracking error signals of the main beam and the two sub-beams upon a lens movement. If a differential push-pull signal is calculated from those tracking error signals with use of the differential push-pull method, the offset in each tracking error signal is almost canceled. At the same time, the amplitudes of the tracking error signals of the two sub-beams are replaced with each other according to the spherical aberration code. This is why the spherical aberration as shown in FIG. 10 comes to be detected.

Figure 14:
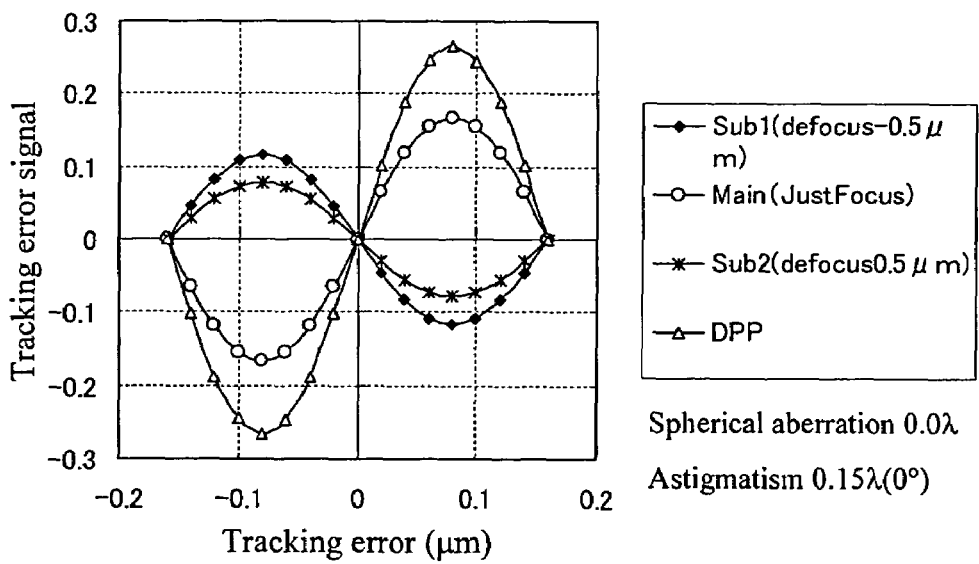
FIG. 14 illustrates tracking error signals detected when astigmatism is recognized.

FIG. 14 illustrates a relationship among tracking error signals of the main beam, the two sub-beams, and a differential push-pull signal (DPP) calculated from those tracking error signals when the spherical aberration is 0 and some astigmatism is detected. Because the spherical aberration is 0, the amplitudes of the tracking error signals of the two sub-beams are expected to be identical ideally. Actually, however, they are unbalanced due to the detected astigmatism. An offset thus occurs in each tracking error signal if the astigmatism of 0.15λ is detected in the radial direction (0°) of the disk.

Figure 15:
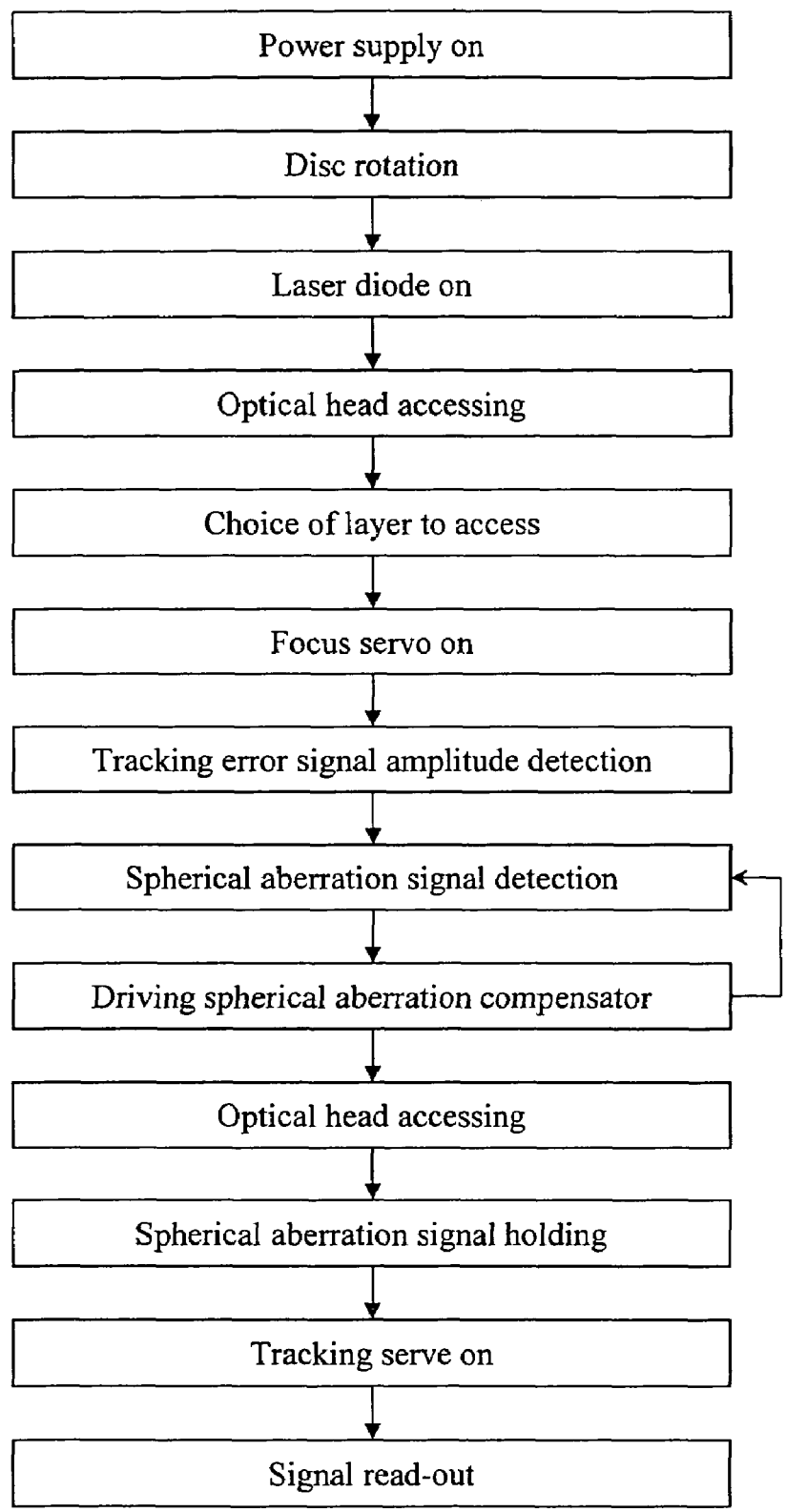
FIG. 15 is a flowchart of spherical aberration compensation processings.

FIG. 15 is a schematic flowchart of spherical aberration compensation processings in the embodiment shown in FIG. 3. At first, the disk drive is powered, then the disk is rotated, the semiconductor laser is turned on, and the optical disk is moved to the control information region located in the innermost periphery of the disk. After that, a recording or reproducing layer is selected according to the command from the CPU when the disk is a two-layer one and the focus servo is turned on so that the main beam at the condensing spot is focused in the recording layer. Concretely, the focal point is moved in one direction around the disk recording film surface and the focus controlling is turned on when the focus error signal passes the 0 level in a predetermined direction. At that time, if the main beam is to be focused in the first layer, the focus controlling is turned on when the focus error signal crosses the 0 level in the predetermined direction for the first time. If the main beam is to be focused in the second layer, the focus controlling is turned on when the focus error signal crosses the 0 level in the predetermined direction for the second time by ignoring the first crossing of the 0 level. After that, while the focus controlling is on, the amplitudes of the tracking error signals are detected in the main beam and the two sub-beams to calculate a differential signal from those tracking error signals to detect a spherical aberration signal. An ordinary envelope detection circuit may be used to detect those tracking error signal amplitudes.

For example, a tracking signal is passed through a differentiation circuit, then sampled at a timing when the tracking signal crosses 0 at a predetermined inclination code and the tracking signal may be updated each time the differentiation signal crosses 0. And, because it is possible to select the upper end envelope or lower envelope according to the inclination code on which the differentiation signal crosses 0, those are detected at the same time, thereby the subject signal amplitude can be detected. The spherical aberration signal obtained such way is used to drive the spherical aberration compensator to control spherical aberration. This is why such controlling is made so that the spherical aberration signal takes a value 0. In that state, the optical head is moved to a predetermined track and the spherical aberration signal is held, then the tracking servo is turned on to reproduce signals.

Second Embodiment

Figure 16:
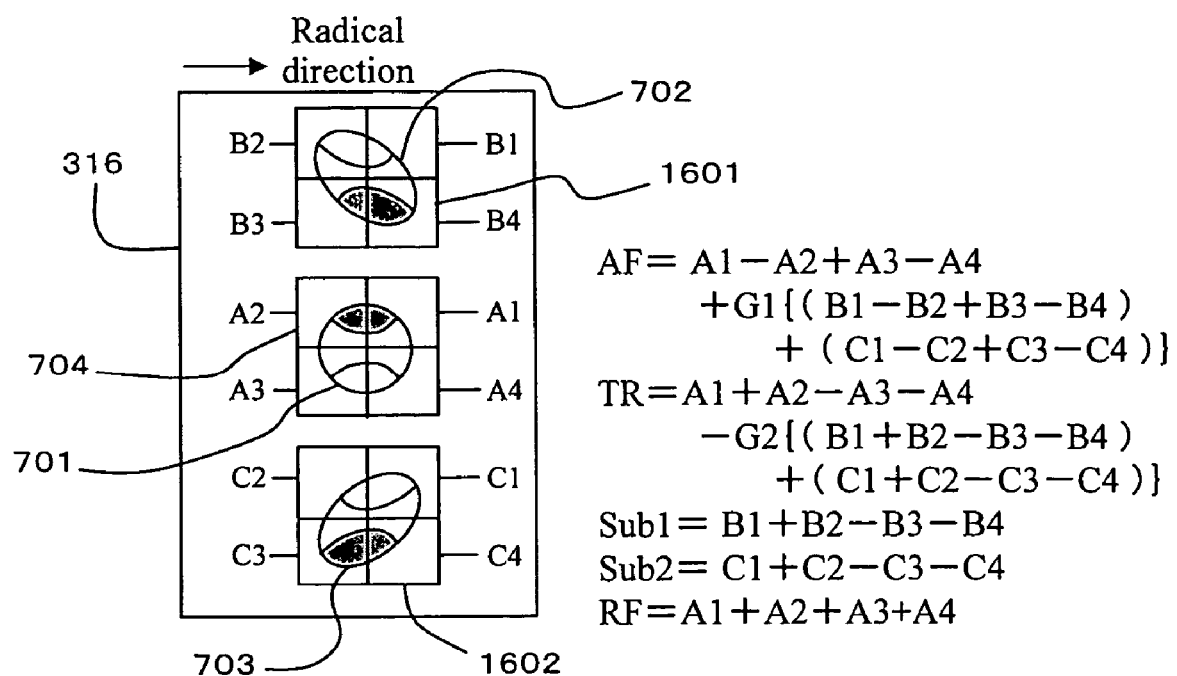
FIG. 16 illustrates received beam patterns detected by a photodetector in the second embodiment of the present invention.

FIG. 16 illustrates beam spot patterns detected by the photodetector shown in FIG. 3 in the second embodiment of the present invention. In this embodiment, the two sub-beam receiving regions are provided as four-divided beam receiving regions 1601 and 1602. As a result, the focus error signals of the two sub-beams are added to the focus error signal of the main beam to calculate a focus error signal, thereby canceling the disturbance to be exerted on the focus error signal when the main spot crosses the disk guiding groove. At that time, because each of the sub-beams are defocused from the main beam, the calculation gain G1/G2 comes to differ between the focus error calculation and the differential push-pull signal calculation. The differential push-pull gain G2 may be determined so that the sum of the intensities of the two sub-beams is almost balanced with the intensity of the main beam. A gain that is about double the G2 is found to be the best to cancel the disturbance to be exerted on the focus error signal.

What is claimed is:

1. An optical disk drive, comprising:
    a beam source;
    an optical system for condensing a light from said light source so as to be irradiated on a medium as a first beam and a second beam that is defocused from said first beam;
    a photodetector for detecting a light reflected from said medium;
    means for detecting a first signal amplitude from said first beam and a second signal amplitude from said second beam to generate a spherical aberration signal from said first signal amplitude and said second signal amplitude;
    a compensator for compensating said spherical aberration according to said spherical aberration signal; and
    controlling means for controlling so that said spherical aberration signal is detected when tracking control is turned off, said spherical aberration is compensated, and detection of said spherical aberration signal is held when tracking control is to be turned on.

2. The optical disk drive according to claim 1, wherein said second beam consists of first and second sub-beams defocused from said first beam focused on a predetermined layer of said medium in the front and rear direction.

3. The optical disk drive according to claim 1, wherein said second beam is formed by a curvilinear diffracted grating.

4. The optical disk drive according to claim 1, wherein said first and second sub-beams are deviated from said first beam just by about ½ of a guiding groove of said medium.

5. The optical disk drive according to claim 1, wherein said photodetector includes a four-divided detector for receiving said first beam used to detect a focus error signal and a reproduction signal and a two-divided detector for receiving said second beam used to detect a tracking error signal.

6. The optical disk drive according to claim 2, wherein said photodetector includes a first four-divided detector for receiving said first beam, a second four-divided detector for detecting said first sub-beam, and a third four-divided detector for detecting said second sub-beam; and
    wherein said drive further includes calculating means for adding up said first sub-beam focus error signal and said second sub-beam focus error signal.

7. An optical disk drive according to claim 1 wherein said defocus value that is about ±0.4 μm.

8. A method for reproducing/recording information, comprising the steps of:
    irradiating a light from a light source on a medium as a main beam focused on a predetermined layer of said medium and as first and second sub-beams defocused from said main beam in the front and rear direction of said main beam;
    detecting a first signal amplitude from said first or second sub-beam included in a light reflected from said medium and a second signal amplitude from said main beam; and
    detecting a spherical aberration signal according to said first and second signal amplitudes while tracking control is turned off and holding detection of said spherical aberration signal when said tracking control is to be turned on so as to compensate spherical aberration according to the value to reproduce or record information from/on said medium.

* * * * *